(12) United States Patent
Mahoney et al.

(10) Patent No.: US 8,535,475 B2
(45) Date of Patent: Sep. 17, 2013

(54) METHOD FOR CONTINUOUSLY ATTACHING A PRIMARY SUBSTRATE TO A SECONDARY SUBSTRATE TO FORM A PRODUCT HAVING INDICIA THEREON

(75) Inventors: Daniel P. Mahoney, Woodstock, CT (US); David P. Natorski, Hebron, CT (US); John J. Tichy, East Lyme, CT (US)

(73) Assignee: Griswold Corporation, Moosup, CT (US)

( * ) Notice: Subject to any disclaimer, the term of this patent is extended or adjusted under 35 U.S.C. 154(b) by 0 days.

(21) Appl. No.: 13/554,814

(22) Filed: Jul. 20, 2012

(65) Prior Publication Data

US 2013/0014893 A1    Jan. 17, 2013

Related U.S. Application Data

(62) Division of application No. 12/755,846, filed on Apr. 7, 2010, now abandoned.

(51) Int. Cl.
*B32B 37/14* (2006.01)
*B29C 65/00* (2006.01)

(52) U.S. Cl.
USPC ............... 156/298; 156/307.7; 156/324

(58) Field of Classification Search
USPC ............ 156/242, 244.11, 244.16, 244.17, 156/244.18, 244.19, 244.27, 246, 27, 7, 324, 156/500, 501, 583.5, 298, 307.1, 307.7
See application file for complete search history.

(56) References Cited

U.S. PATENT DOCUMENTS

| | | | | |
|---|---|---|---|---|
| 4,715,912 A | * | 12/1987 | Tillotson | 156/79 |
| 4,916,193 A | * | 4/1990 | Tang et al. | 525/413 |
| 5,484,639 A | * | 1/1996 | Woodall et al. | 428/95 |
| 5,709,766 A | * | 1/1998 | Press et al. | 156/307.3 |
| 6,251,214 B1 | * | 6/2001 | Ritchie | 156/327 |
| 2003/0104148 A1 | * | 6/2003 | Marx et al. | 428/35.2 |

* cited by examiner

*Primary Examiner* — Katarzyna Wyrozebski Lee
*Assistant Examiner* — Scott W Dodds
(74) *Attorney, Agent, or Firm* — McCracken & Frank LLC

(57) ABSTRACT

In one embodiment, a method of attaching one substrate to another substrate includes supplying a first substrate having an indicium thereon from a first source, supplying a second substrate from a second source, wherein the supplying is accomplished in a continuous manner, and curing the substrates until the substrates are bonded thereto to form a product. The method disclosed herein allows a fabric to be integrally bonded to either an elastomeric composition or a urethane composition utilizing a continuous process. The product includes indicium that identifies or conveys information about the product.

12 Claims, 6 Drawing Sheets

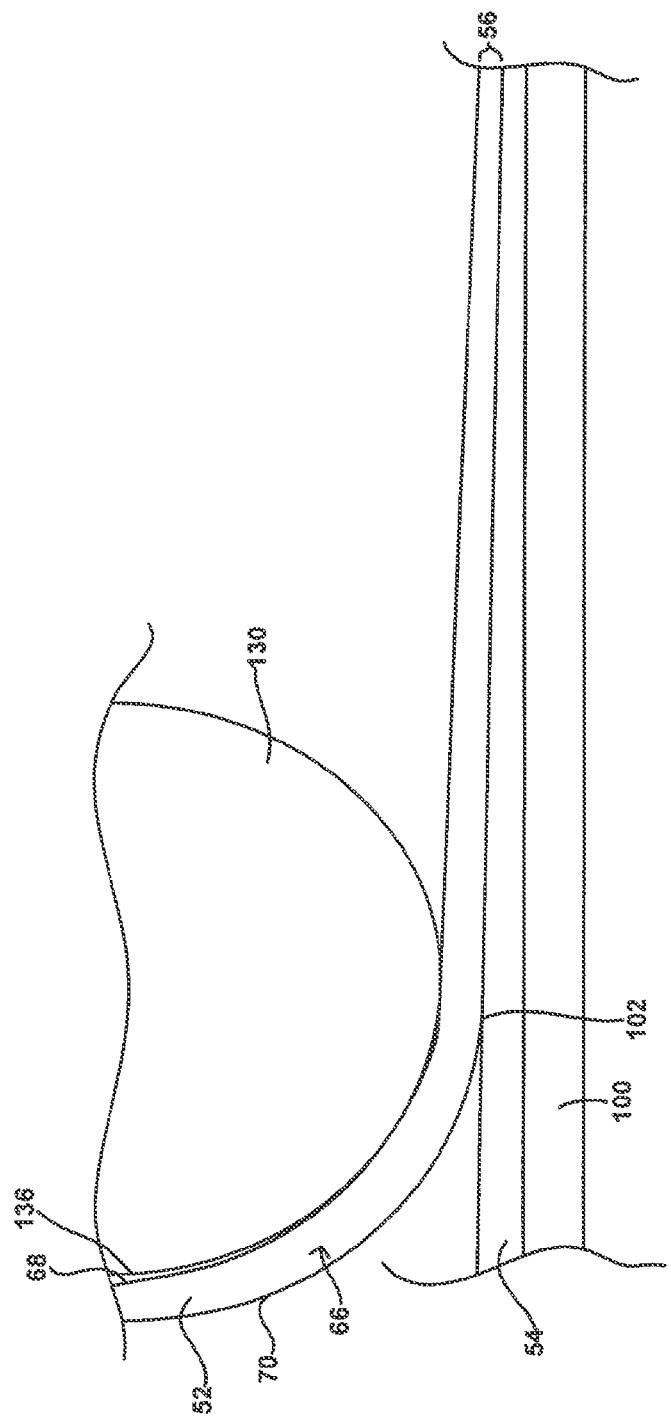

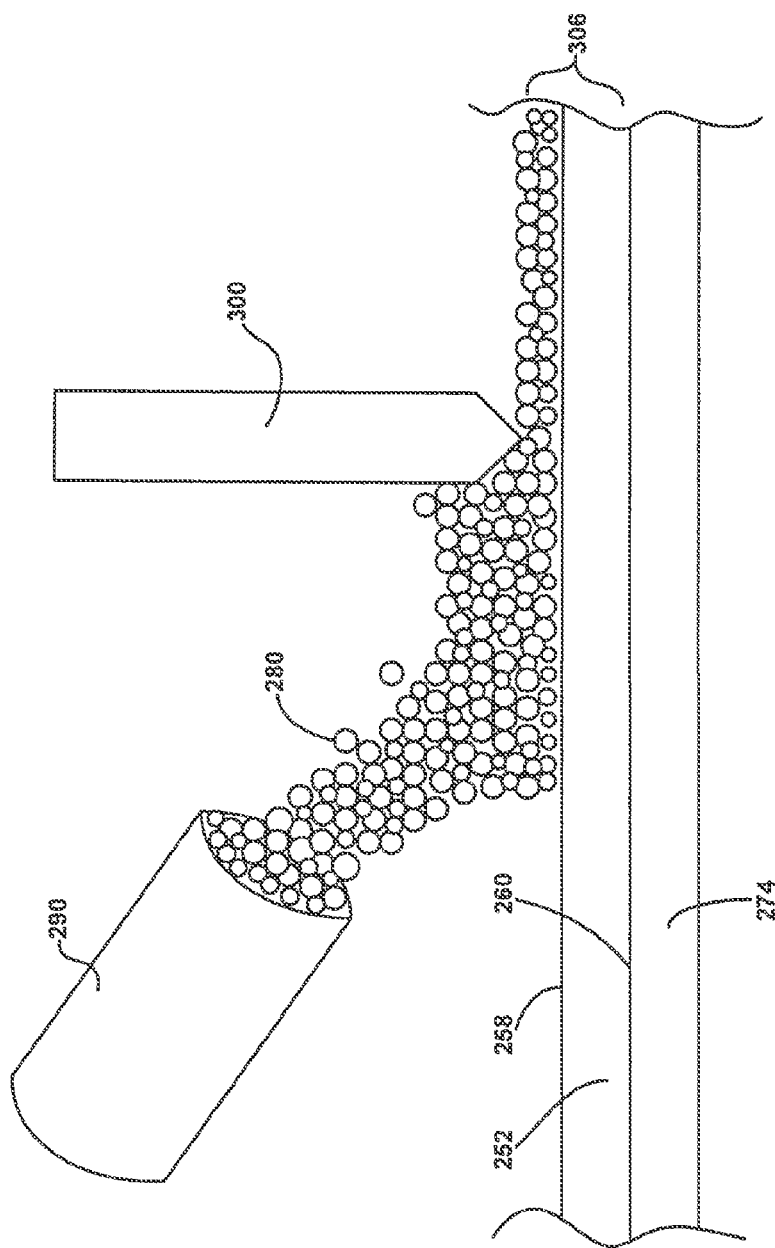

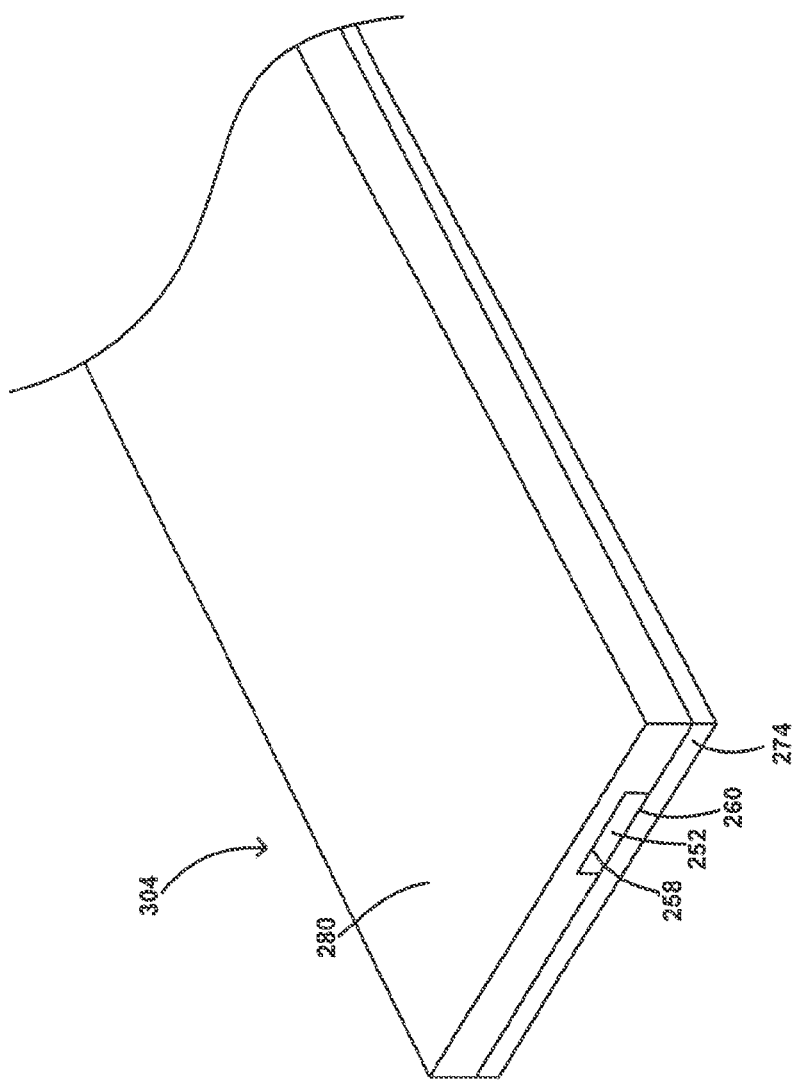

METHOD FOR CONTINUOUSLY ATTACHING A PRIMARY SUBSTRATE TO A SECONDARY SUBSTRATE TO FORM A PRODUCT HAVING INDICIA THEREON

CROSS REFERENCE TO RELATED APPLICATIONS

This application is a divisional of U.S. application Ser. No. 12/755,846, filed on Apr. 7, 2010, which is incorporated by reference herein in its entirety.

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Invention

The present invention relates generally to an apparatus and a continuous method of attaching a first substrate to second substrate, and more specifically an apparatus and a method of continuously attaching a fabric to an elastomer and/or a urethane composition to form a product, wherein the product includes indicia thereon.

2. Background of the Invention

Methods for attaching one substrate to another substrate typically involve molds that can only accommodate single-run or batch processing. For example, elastomer substrates normally require specialized processing conditions based on the properties of the elastomer. In some typical methods, an elastomer substrate is placed into a mold of the desired shape and size. A second substrate is inserted into the mold, applied to a top surface of the elastomer substrate, and then the mold is sealed or otherwise closed and heated. The finalized product is removed from the mold and a new elastomer substrate is placed into the mold. This process is repeated as desired. This system suffers from many drawbacks including the extensive physical labor involved in applying and removing the substrates and the overall time-consuming nature of the process. As a result, this method is expensive to use because of the single run nature.

Another known method to attach an elastomer to a substrate involves supplying an elastomer in the desired shape and size and separately supplying and attaching the second substrate in a separate step in the manufacturing process. An adhesive or other attaching agent is applied to a surface of the elastomer and the second substrate is placed onto the adhesive. In some cases, a press or clamp is used to secure the elastomer-adhesive-second substrate together until the bond is secure. This system includes a number of drawbacks as well. For example, the adhesive bond may degrade over time and may not be as strong as bonds formed by other methods, such as, for example, bonds formed by heating or vulcanization. Further, the steps to apply adhesive or other bonding material to attach the elastomer to the second substrate requires extra steps and equipment during the manufacturing process, which results in an increased cost to the consumer.

In many instances, a product is labeled or otherwise imprinted to designate information about the product such as manufacturer, patent number, place of origin, code date, and the like. Such labeling frequently occurs as a separate step after the manufacturing process. The labeling can be post-applied or printed onto the product using standard equipment as known in the art. Printing the product after the manufacturing process creates additional problems including increased cost to the consumer, transportation of the product from the manufacturing facility to the printing facility, and additional resources to accomplish product labeling. Frequently the product labeling process is bypassed because of the stringent requirements of commercial printers, for example, minimum quantities for print jobs. The commercial printing requirements frequently make such labeling cost-prohibitive.

It has been heretofore unknown how to attach a first substrate to an elastomer and/or a urethane composition in a continuous process involving vulcanization because of the difficulties of controlling the processing conditions. In instances where continuous processing has been attempted, the product that is made as a result of the processing may be deformed or may not include the desired properties, for example, surface properties, strength properties, and the like. It is also unknown how to label a product during the manufacturing process using the process described herein.

SUMMARY OF THE INVENTION

In one embodiment, a method of attaching two substrates includes supplying a first substrate from a first source, wherein the first substrate is a fabric having an indicium thereon. A second substrate is supplied from a second source and the substrates are cured until the substrates are bonded to each other to form a product, wherein the indicium is visible on the product.

In another embodiment, an apparatus for continuously attaching a first substrate to a second substrate comprises a first substrate supply source that continuously dispenses a first substrate onto a top surface of a second substrate, wherein the first substrate includes an indicium thereon. The apparatus also includes a second substrate supply source that continuously dispenses the second substrate onto a conveyor and a secondary conveyor system that presses the first substrate into the second substrate. A heating mechanism heats the first substrate and the second substrate, wherein the first substrate is vulcanized to the second substrate to form a product having a substantially smooth surface and the indicium is visible on the smooth surface.

In yet a different embodiment, a method of identifying a source of goods comprises the steps of providing a first substrate having an indicium, providing a second substrate comprising an elastomeric composition, and vulcanizing the first substrate to the second substrate to form a product, wherein the indicium is visible on the product to identify the source of the product.

Other aspects and advantages of the present invention will become apparent upon consideration of the following detailed description.

BRIEF DESCRIPTION OF THE DRAWINGS

FIG. 1A is an enlarged side elevational view of an area C of FIG. 1, wherein a bottom surface of a first substrate contacts a top surface of a second substrate;

FIG. 2A is an enlarged side elevational view of an area N of FIG. 2, wherein a second substrate is attached to a first substrate; and FIG. 2B is a partial isometric view of a product formed by the attachment apparatus of FIG. 2.

DETAILED DESCRIPTION OF THE PREFERRED EMBODIMENTS

Figure 1:
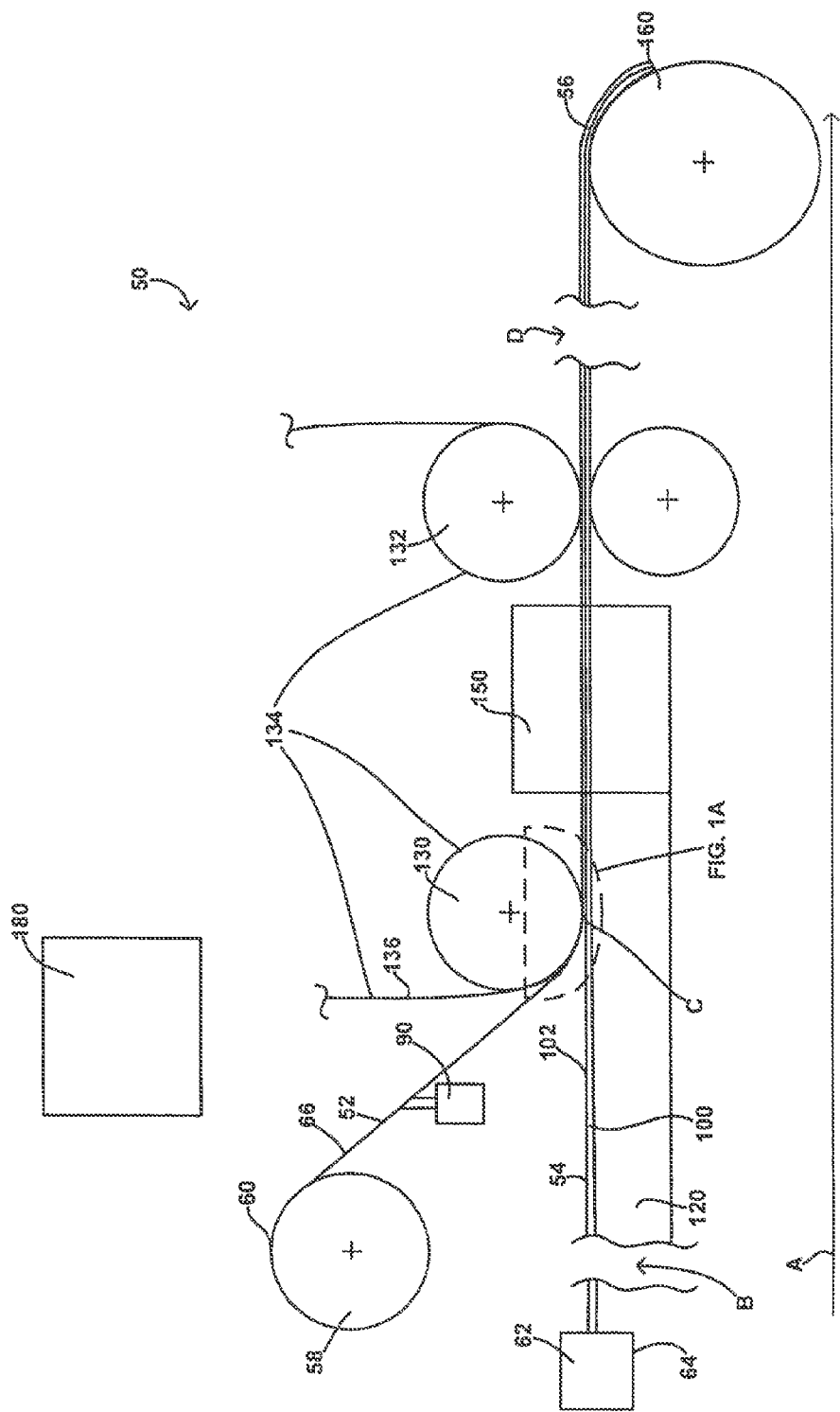
FIG. 1 is a schematic side elevational view of an attachment apparatus of the invention.

FIG. 1 shows an embodiment of an attaching system 50 generally configured to attach a first substrate 52 to a second substrate 54 to form a substantially unitary product 56. The system 50 operates in the direction indicated by arrow A in a substantially continuous manner. Specifically, the first and second substrates 52, 54 are supplied and attached to each other continuously without stopping the process, with the exception of changing out the substrates and/or typical process stoppages such as maintenance and the like. The attaching system 50 includes a first substrate supply source 58 provided in the form of a first spool 60 and a second substrate supply source 62 provided in the form of a calendering system 64. Although the first substrate supply source 58 is depicted as a spool 60, the first substrate 52 can be supplied from other sources as known in the art.

The second substrate supply source 62 is in the form of a calendering system 64 and includes a plurality of rolls (not shown) configured in either an "L" or a "Z" configuration in a manner known in the art. The calendering system 64 applies heat and pressure to densify, smooth, or otherwise modify the properties of the second substrate 54. The calendaring system 64 may apply further surface treatment to the second substrate 54 to enhance surface properties, adjust sheet thickness, and/or otherwise prepare the second substrate 54 for the attaching system 50. Although a calendering system 64 is depicted, the second substrate 54 may be prepared for the attaching system 50 beforehand and thus, no calendering system 64 is needed. Further, the second substrate 54 may be supplied to the attaching system 50 in other ways such as using an extruder and the like.

As best seen in FIGS. 1 and 1A, the first substrate 52 is supplied from the first substrate supply source 58 as a thin strip in the form of a substantially rectangular braid 66 that includes a top surface 68 and a bottom surface 70. The first substrate 52 is originally wound around the first spool 60, wherein the bottom surface 70 contacts the first spool 60 or other braid 66 on the spool 60 and the top surface 68 is exposed to the surrounding environment. Although the first substrate 52 is supplied as a substantially flat, rectangular strip, the first substrate 52 could be supplied in other shapes and sizes including cylindrical, triangular, and/or any other compatible shapes known in the art. The thickness of the first substrate 52 may vary, but in a preferred embodiment, the first substrate 52 is between about 0.05 mm and about 50 mm thick, more preferably about 10 mm to about 30 mm thick, and most preferably about 15 mm thick. Preferably, the first substrate 52 is about 2.5 mm to about 250 mm wide, more preferably about 12 mm to about 75 mm wide, and most preferably about 20 mm wide.

The first substrate 52 preferably comprises fabric and/or fabric blends such as natural fibers, synthetic fibers, and/or any woven blends thereof. Specific kinds of fabric preferred for use in the attaching system 50 include polyester and/or cotton and the like. For example, any of the fabrics available from Shoefly Designs™ located in Hickory, N.C., are suitable for use as the first substrate 52. One preferable first substrate 52 is similar to that of a substantially flat cotton shoelace.

The first substrate 52 also includes indicia 80 (shown in FIG. 1B), printed information, and/or other markings thereof. The indicia 80 may include information such as trade names, company names, product names, and the like. The indicia 80 may, alternatively or in addition to, be any symbol or character that conveys information. The indicia 80 may act as a source of the product 56 and/or act as a source of advertising or other information. The printed information 80 is preferably applied and/or is otherwise incorporated into the first substrate 52 on the top surface 68 of the first substrate 52 before entering the attaching system 50. The indicia 80 are preferably a contrasting color from the first substrate 52 such that the indicia 80 is visible. The indicia 80 may be continuous or discrete and may comprise any number of indicia 80. The indicia 80 allow the product 56 to provide a method of identifying a source the product 56.

The first substrate 52 with pre-printed indicia 80 therein is supplied and a second substrate 54 is provided and comprises either an elastomeric composition or a urethane composition as described in more detail hereinbelow. The first substrate 52 and the second substrate 54 are vulcanized, cured, or otherwise attached to form the product 56, wherein the pre-printed indicia 80 are visible on the product 56 to identify the source of the product 56 and/or to convey other information described herein.

Still referring to FIG. 1, the first substrate 52 optionally passes through a guiding mechanism in the form of a tape guide 90. The tape guide 90 acts to properly align the first substrate 52 with a main conveyor 100 that runs throughout the length of the process. The tape guide 90 used in the attaching system 50 is one that is known in the art. Other guiding mechanisms may be used so long as the mechanism assists in properly aligning the first substrate 52 as it is being supplied to the main conveyor 100. Alternatively, the attaching system 50 may operate without a tape guide 90 if the first substrate supply source 58 is adapted to supply and properly align the first substrate 52 directly onto the main conveyor 100. Once the first substrate 52 passes through the tape guide 90, the bottom surface 70 of the first substrate 52 is guided onto and contacts a top surface 102 of the second substrate 54 as the first substrate 52 is being supplied to the main conveyor 100. The first and second substrates 52, 54 are joined thereafter using the process as described in more detail hereinbelow. In some embodiments, multiple first substrates 52 are supplied into the attaching system 50 and may utilize a plurality of tape guides 90 to guide the substrates 52 individually onto the main conveyor 100. The tape guide 90 is preferably adjustable such that it is easy for an operator of the attaching system 50 to adjust and move the tape guide 90 to an appropriate position, such as between manufacturing runs.

The second substrate 54 is supplied from the second substrate supply source 62 and is supplied onto the main conveyor 100 as an elastomeric composition 110 that includes the top surface 102 and a bottom surface 114. The bottom surface 114 contacts the main conveyor 100 and is moved through the attaching system 50 in the direction indicated by arrow A. Although the second substrate 54 is depicted as a substantially flat mat, the second substrate 54 can be supplied in other shapes and sizes as known in the art. The thickness of the second substrate 54 may vary according to the desired product. In a preferred embodiment, the second substrate 54 is about 10 mm to about 500 mm thick and about 10 mm to about 500 mm wide.

The elastomeric composition 110 is preferably provided in a form that is initially uncured and provided in a substantially solid form. In a preferred embodiment, the composition generally comprises about 20% to about 40% rubber, about 40% to about 60% fillers, about 2% to about 10% process oil, and about 5% to about 15% other additives. One suitable composition is Kushon® brand rubber, which is available from the Griswold Corporation located in Moosup, Conn. Other suitable elastomeric compositions include a natural rubber and/or blends including neoprene, silicone, styrene-butadiene, nitrile blends, and the like. Suitable fillers for use in the elastomeric composition include clay, silica, blends thereof, and the like. Examples of other additives include blowing agents, activating agents, curing agents, and other additives known in the art.

Referring again to FIG. 1, a heating mechanism 120 in the form of a platen heating system is provided adjacent the main conveyor 100 to supply thermal energy to the second substrate 54 at a point B, which is adjacent the second substrate supply source 62. The platen heating system operates to heat the second substrate 54 to the desired temperature for the curing process. In some embodiments, the heating mechanism 120 heats the second substrate 54 to a temperature of about 200° F. to about 400° F. such that the elastomeric composition becomes cured. The heating mechanism 120 is depicted adjacent a bottom surface 122 of the main conveyor 100, but alternatively or additionally can be adjacent a top surface 124 of the main conveyor 100 such that the second substrate 54 is heated to the desired temperature. The second substrate 54 expands as the temperature is increased as the second substrate 54 moves throughout the attaching system 50 as described in more detail hereinbelow.

Although a platen heating system is discussed as a heating mechanism herein, other types of heating may be sufficient to heat the second substrate 54 to the desired temperature including gas heated ovens, microwaved heating, hot air blowers, and the like. Generally, the heating process takes between about 4 minutes and about 10 minutes, but varies according to a variety of factors including the exact composition of the elastomeric composition, the thickness of the second substrate 54, the speed of the main conveyor 100, and other process parameters as known in the art. A person having skill in the art should be able to choose a heating mechanism that heats the second substrate 54 to the desired temperature, which takes into account all of the pertinent manufacturing considerations.

Now turning to the attachment process, the bottom surface 70 of the first substrate 52 contacts the top surface 102 of the second substrate 54 at an area C adjacent a first drive roll 130. A secondary conveyor system 134 comprises the first drive roll 130 and a second drive roll 132 with a secondary conveyor belt 136 attached thereto. The secondary conveyor system 134 is self-contained and separate from the main conveyor 100 and runs in a continuous manner. As the first and second substrates 52, 54 pass under the first drive roll 130 and the secondary conveyor belt 136, the substrates 52, 54 are pressed together to form a unitary structure. The function of the secondary conveyor system 134 is to provide downward force on to the top surface 68 of the first substrate 52 to push the first substrate 52 into and below the top surface 102 of the second substrate 54 to form a substantially flat top surface 138 of the finalized product 56. After the first and second substrates 52, 54 pass the first drive roll 130, the product 56 enters a secondary heating area 150 to continue the attaching process.

The attaching process involves vulcanizing and/or curing the elastomer while the second substrate 54 expands into the first substrate 52. As the substrates 52, 54 undergo the vulcanization process, a substantially irreversible bond is formed to create the finished product 56. In some preferred embodiments, the temperature and time for achieving vulcanization is generally between about 4 minutes to about 10 minutes at between about 200° F. and about 400° F. A vulcanized bond is formed between the first substrate 52 and the second substrate 54, which is much more heat stable than bonds procured by, for example, adhesives used in prior art processes. Although specific parameters are given with respect to the vulcanization process described herein, one having ordinary skill in the art will understand how to adjust the process parameters (such as temperature) to achieve a particular bond quality desired for various different materials being utilized.

After the second substrate 54 is vulcanized with the first substrate 52 therein, the product 56 moves past the second drive roll 132 into a cooling zone, which is depicted as area D. During a cooling step, the cooling zone D allows the product 56 to cool down to approximately room temperature, which is about 20 to about 25 degrees Celsius. The cooling zone D may include cooling devices in the form of cooling cans, fans, water bottles, and/or other elements that help to facilitate the cooling process. Alternatively, the product 56 may proceed on the main conveyor 100 a length sufficient to cool the product 56 to an appropriate temperature without cooling devices for final processing. Depending on the cooling device(s) being utilized, cooling may be completed in less than a minute.

After the cooling step, the product 56 is collected onto a product roll 160 and is ready for final distribution. The product 56 may undergo additional processing steps prior to or after the collection such as cutting the product, imprinting additional surface markings, applying coatings, and the like. Other processing steps may be utilized as desired.

Figure 1B:
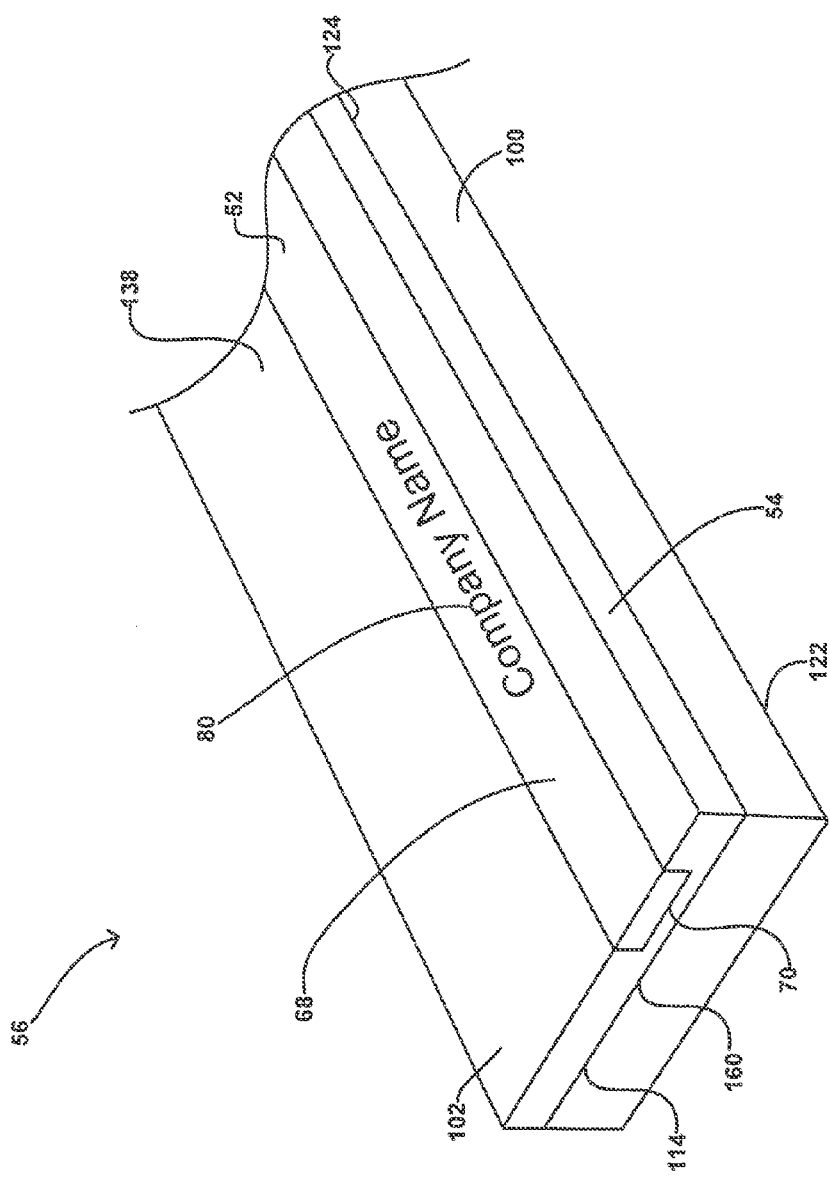
FIG. 1B is a partial isometric view of a product formed by the attachment apparatus of FIG. 1.

As shown in FIG. 1B, the final product 56 preferably includes the top surface 138 comprising the top surface 68 of the first substrate 52 that is flush with and forms a flat surface with the top surface 102 of the second substrate 54. The product 56 further includes a bottom surface 160 that comprises the bottom surface 114 of the second substrate 54. The final product 56 advantageously includes a flush top surface 138 so as to not disrupt the uniformity of the surface, which is a significant advantage over prior art products. Some minor imperfections may be visible on the top surface 138 because of the manufacturing process. The final product 56 may be used in a variety of manufactured goods including slip pads, yoga mats, mouse pads, and/or moving fabrics, in which items to be moved are protected with the final product 56.

Figure 2:
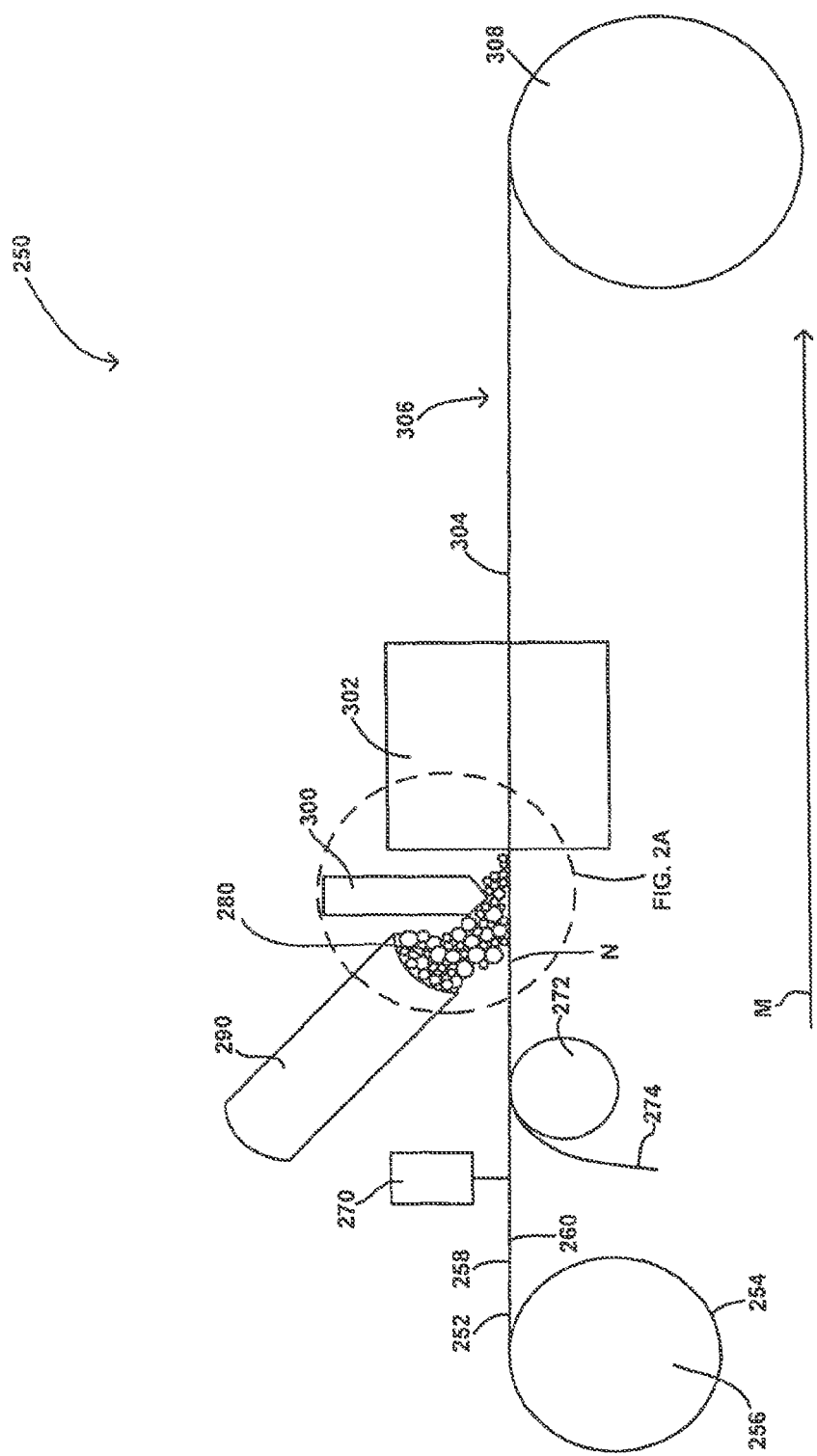
FIG. 2 is a schematic side elevational view of another attachment apparatus.

Another embodiment of an attaching system 250 is depicted in FIG. 2, which includes similar components as to those described with respect to the attaching system 50 described above with the exception of the differences noted hereinbelow. The attaching system 250 moves continuously in a direction as denoted by arrow M. A first substrate 252 is dispensed from a first substrate supply source 254 in the form of a spool 256. The first substrate 252 is preferably a fabric and/or fabric blend with indicia as described previously herein, wherein the fabric includes a first side 258 and a second side 260 opposite the first side 258.

A tape guide 270 may optionally be included to assist in guiding the first substrate 252 through the attaching system 250. An idler roll 272 is preferably present in an area adjacent the tape guide 270 to guide a release liner 274 onto the second side 260 of the first substrate 252. The release liner 274 provides a substantially stable surface in which the first substrate 252 can be supported thereon. The first substrate 252 travels through the attaching system 250 and approaches point N, which is where a second substrate 280 is supplied onto the first side 258 of the first substrate 252.

The second substrate 280 is preferably supplied in liquid form and is preferably a urethane composition. The urethane composition generally comprises about 40% to about 70% polyols, about 15% to about 25% isocyanates, about 10% to about 20% fillers and about 1% to about 5% catalyst. A suitable urethane composition is available under the trade name Enlighten-u® from Griswold Corporation, Moosup, Conn.

The urethane composition is dispensed out of a dispensing tube 290 onto the first side 258 of the first substrate 252. The dispensing tube 290 preferably dispenses the urethane composition at a speed between about 3 feet/min to about 40 feet/min. Although a dispensing tube is depicted, the urethane composition may be dispensed or supplied to the attaching system 250 through other mechanisms as known in the art. As the urethane composition is dispensed, the first substrate 252 with the release liner 274 on the second side 260 thereof and the urethane composition on the first side 258 travel in the direction M to move through the system to undergo the attaching process as described in more detail below.

A doctor knife 300 is disposed adjacent the dispensing tube 290 that forms the urethane composition into a thin layer that contacts the first substrate 252 as the urethane composition and first substrate 252 are moved through the attaching system 250. The knife 300 is disposed about 0.5 mm to about 30 mm above the first side 258 of the substrate 258 such that a layer of the urethane composition is dispensed onto the first substrate 252.

As the first substrate 252 and the urethane composition move past the knife 300, a heating mechanism 302 in the form of a platen heating system is provided adjacent the first substrate 252 to supply thermal energy. Similar to the first attaching system 50, the heating mechanism 302 heats the urethane composition to a temperature of about 200° F. to about 400° F. The urethane composition expands as the temperature is increased and the first substrate 252 is pressed into the expanded urethane composition during a curing process. As the urethane composition and the first substrate 252 go through the curing process, the first substrate 252 becomes embedded into the urethane composition thereby forming a substantially flat product 304.

The product 304 moves away from the heating mechanism toward a cooling zone 306. The cooling zone 306 allows the product 304 to cool down to approximately room temperature. The cooling zone 306 may include cooling devices in the form of cooling cans, fans and/or other blowing elements that help to facilitate the cooling process. Depending on the cooling device(s) being utilized, cooling may be done in less than a minute.

After exiting the cooling zone 306, the product 304 is collected onto a product roll 308 and is ready for final distribution. The product 304 may undergo additional processing steps prior to or after the collection such as cutting the product, imprinting additional surface markings, applying coatings, and the like. Other processing steps may be utilized as desired.

As shown in FIG. 2B, the final product 304 includes the urethane composition 280 that surrounds the first substrate 252 and the release liner 274 on an opposing side thereof. The release liner 274 is adapted to be removed prior to the final product 304 being utilized. In some forms, the release liner 274 may be excluded from the process. A conveyor or other suitable mechanism may be employed to support the first substrate 252 and urethane composition as they are moved through the attaching system 250.

In a preferred form, various components throughout the attaching systems 50, 250 described herein are electrically connected to a controller 180. The controller 180 sends operational parameters to the individual components with respect to speed of the conveyors and spools, temperature of the heating elements, and all other parameters needed to operate the system. The controller 180 can be any kind known in the art, but typically includes a computer and appropriate process control software and data and/or control connections to the components in a manner sufficient to control the systems 50, 250 as described herein.

Other substrates may be used including other heat curable and/or thermoformable materials and other fabric-like materials, including other materials that exhibit sufficient properties to accept the heat curable and/or thermoformable materials.

In any of the embodiments herein, it is to be understood that a plurality of fabrics in varying shapes and sizes can be utilized in the attaching process at the same time, which results in a product having multiple fabric strips embedded therein. Further, other processing equipment may be utilized in addition to or in place of the various components described herein.

INDUSTRIAL APPLICABILITY

An apparatus and method for a continuous attaching system is described that overcomes numerous disadvantages disclosed in the prior art. The continuous method includes attaching a first fabric substrate having indicia thereon to a second substrate comprising either an elastomeric composition or a urethane composition. The first and second substrates are vulcanized to form a product having increased bond strength and stability.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out the same. The exclusive rights to all modifications that come within the scope of the appended claims are reserved.

We claim:

1. A method of attaching two substrates, comprising:
supplying a first substrate from a first source, wherein the first substrate is a fabric having an indicium thereon;
supplying a second substrate from a second source, wherein the second substrate is wider than the first substrate;
embedding, the first substrate into the second substrate so that a top surface of the first substrate is flush with a to surface of the second substrate; and
curing the second substrate until the substrates are bonded to each other to form a product, wherein the indicium is visible on the product.

2. The method of claim 1, wherein the second substrate is an elastomeric composition.

3. The method of claim 2, wherein the second substrate is a urethane composition.

4. The method of claim 1, wherein the first substrate is a braid.

5. The method of claim 1, wherein the first and second substrates are bonded to each other to form a substantially unitary product.

6. The method of claim 1, wherein the curing is accomplished through heating from a platen heating system.

7. The method of claim 6, wherein the platen heating system includes plates disposed adjacent a conveyor to heat the second substrate.

8. The method of claim 1, wherein the first and second substrates are attached to each other in a continuous manner.

9. A method of manufacturing identifiable goods, comprising:
- providing a first substrate comprising a fabric having an indicium thereon;
- providing a second substrate comprising an elastomeric composition, wherein the second substrate is wider than the first substrate;
- embedding the first substrate into the elastomeric composition so that a top surface of the first substrate is flush with a to surface of the second substrate; and
- curing the second substrate to the first substrate to form a product, wherein the indicium is visible on the product to display information about the product.

10. The method of claim 9, wherein the method further includes the step of applying the indicium onto the first substrate before the first substrate is provided.

11. The method of claim 9, wherein the first and second substrates are provided in a substantially continuously manner.

12. The method of claim 9, wherein the elastomeric composition is uncured.

* * * * *